United States Patent
Yin et al.

(10) Patent No.: US 12,106,221 B2
(45) Date of Patent: Oct. 1, 2024

(54) PREDICTING FUNCTIONAL TAGS OF SEMANTIC ROLE LABELING

(71) Applicant: International Business Machines Corporation, Armonk, NY (US)

(72) Inventors: Peifeng Yin, San Jose, CA (US); Yunyao Li, San Jose, CA (US); Taiga Nakamura, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1411 days.

(21) Appl. No.: 16/440,862

(22) Filed: Jun. 13, 2019

(65) Prior Publication Data

US 2020/0394553 A1 Dec. 17, 2020

(51) Int. Cl.
| | | |
|---|---|---|
| G06N 3/084 | (2023.01) | |
| G06F 18/2113 | (2023.01) | |
| G06F 18/214 | (2023.01) | |
| G06F 18/243 | (2023.01) | |
| G06N 20/00 | (2019.01) | |

(52) U.S. Cl.
CPC ......... *G06N 3/084* (2013.01); *G06F 18/2113* (2023.01); *G06F 18/2155* (2023.01); *G06F 18/24323* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 8,527,262 B2 | 9/2013 | Kambhatla et al. | |
| 2003/0128863 A1* | 7/2003 | Hayashi | G06T 1/0021 382/100 |
| 2005/0251765 A1* | 11/2005 | Ahmad | G06F 30/33 716/106 |
| 2008/0004940 A1* | 1/2008 | Rolleston Phillips | G06Q 30/0202 705/7.31 |
| 2008/0221878 A1* | 9/2008 | Collobert | G06F 40/30 704/232 |
| 2008/0319735 A1* | 12/2008 | Kambhatla | G06F 40/30 704/9 |
| 2009/0144609 A1* | 6/2009 | Liang | G06F 40/284 707/999.005 |
| 2009/0210218 A1* | 8/2009 | Collobert | G06F 40/284 704/9 |

(Continued)

OTHER PUBLICATIONS

Marcheggiani et al., A Simple and Accurate Syntax-Agnostic Neural Model for Dependency-based Semantic Role Labeling, 2017, arXiv:1701.02593v2 (Year: 2017).*

(Continued)

*Primary Examiner* — Anh-Tuan V Nguyen
(74) *Attorney, Agent, or Firm* — Zilka-Kotab, P.C.

(57) ABSTRACT

A computer-implemented method according to one embodiment includes receiving, at a scheduler, a training data instance and a target instance, generating, by the scheduler, an input sequence from the training data instance and the target instance, sending the input sequence from the scheduler to an encoder, mapping, by the encoder, the input sequence to a feature vector, sending the feature vector from the encoder to the scheduler, sending the feature vector from the scheduler to a predictor, and mapping, by the predictor, the feature vector to a class vector to create a label for the target instance.

20 Claims, 8 Drawing Sheets

(56) References Cited

U.S. PATENT DOCUMENTS

| | | | | |
|---|---|---|---|---|
| 2010/0296595 | A1* | 11/2010 | Senba | H04B 7/0628 375/295 |
| 2011/0301942 | A1* | 12/2011 | Collobert | G06F 40/289 704/E11.001 |
| 2013/0139261 | A1* | 5/2013 | Friedrichs | G06F 21/00 726/23 |
| 2014/0136188 | A1* | 5/2014 | Wroczynski | G06F 40/284 704/9 |
| 2015/0198443 | A1* | 7/2015 | Yi | G06N 20/00 702/150 |
| 2015/0254330 | A1* | 9/2015 | Chan | G06F 16/273 707/613 |
| 2016/0140210 | A1* | 5/2016 | Pendyala | G06F 40/205 707/737 |
| 2017/0091170 | A1* | 3/2017 | Cardillo | G06F 40/56 |
| 2017/0177715 | A1* | 6/2017 | Chang | G06N 5/04 |
| 2017/0308790 | A1* | 10/2017 | Nogueira Dos Santos | G06N 3/045 |
| 2017/0315984 | A1* | 11/2017 | Goyal | G06F 40/30 |
| 2017/0330056 | A1* | 11/2017 | Merhav | G06V 10/82 |
| 2017/0337474 | A1* | 11/2017 | Li | G06F 40/35 |
| 2018/0082680 | A1* | 3/2018 | Pereg | G10L 15/1822 |
| 2018/0121788 | A1 | 5/2018 | Hashimoto et al. | |
| 2018/0157691 | A1* | 6/2018 | Venanzi | G06F 16/24522 |
| 2019/0244060 | A1* | 8/2019 | Dundar | G06T 15/00 |
| 2019/0353822 | A1* | 11/2019 | Labov | G01T 1/167 |
| 2020/0104645 | A1* | 4/2020 | Ionescu | G06V 10/454 |
| 2020/0250267 | A1* | 8/2020 | Agarwal | G06F 40/289 |
| 2020/0265116 | A1* | 8/2020 | Chatterjee | G06F 18/2431 |
| 2020/0312297 | A1* | 10/2020 | Chatterjee | G06F 40/169 |

OTHER PUBLICATIONS

He et al., Syntax for Semantic Role Labeling, to be, or not to be, 2018, Proceedings of the 56th Annual Meeting of the Association for Computational Linguistics (Long Papers), pp. 2061-2071 (Year: 2018).*

Connor et al., "Starting From Scratch in Semantic Role Labeling," Proceedings of the 48th Annual Meeting of the Association for Computational Linguistics (ACL'10), 2010, 10 pages.

Marcheggiani et al., "A Simple and Accurate Syntax-Agnostic Neural Model for Dependency-based Semantic Role Labeling," Proceedings of the 21st Conference on Computational Natural Language Learning (CoNLL 2017), Aug. 3-Aug. 4, 2017, pp. 411-420.

He et al., "Question—Answer Driven Semantic Role Labeling: Using Natural Language to Annotate Natural Language," Proceedings of the Conference on Empirical Methods in Natural Language Processing, Sep. 2015, 11 pages.

Anonymous, "Method to extract simple and compound terms from text corpuses (without performing full semantic analysis)," IP.com Prior Art Database Technical Disclosure, IPCOM000220204D, Jul. 25, 2012, pp. 1-6.

Cetintas et al., "Method and System for Modelling Content Complexity, Consistency and Effect on User Engagement," IP.com Prior Art Database Technical Disclosure, IPCOM000246822D, Jul. 4, 2016, pp. 1-5.

Anonymous, "Recognizing Semantic Formatting Information in a Document," IP.com Prior Art Database Technical Disclosure, IPCOM000251990D, Dec. 13, 2017, 35 pages.

Anonymous, "Semantic Role Labeling (SRL)," PowerPoint presentation from INF5830, Fall 2013, pp. 1-39, retrieved from http://folk.uio.no/liljao/inf5830/inf5830_srl.pdf.

Github, "The Proposition Bank (PropBank)," accessed on Jun. 13, 2019, 2 pages, retrieved from http://verbs.colorado.edu/propbank/framesets-english/.

Akbik et al., "K-SRL: Instance-based Learning for Semantic Role Labeling," Proceedings of COLING 2016, the 26th International Conference on Computational Linguistics: Technical Papers, Dec. 11-17, 2016, pp. 599-608.

He et al., "Deep Semantic Role Labeling: What Works and What's Next," Proceedings of the 55th Annual Meeting of the Association for Computational Linguistics, Jul. 30-Aug. 4, 2017, pp. 473-483.

Barnickel et al., "Large Scale Application of Neural Network Based Semantic Role Labeling for Automated Relation Extraction from Biomedical Texts," PLoS ONE, vol. 4, Issue. 7, Jul. 28, 2009, pp. 1-6.

Bjorkelund et al., "Multilingual Semantic Role Labeling," Association for Computational Linguistics, Proceedings of the Thirteenth Conference on Computational Natural Language Learning (CoNLL): Shared Task, Jun. 2009, pp. 43-48.

Bonial et al., "English PropBank Annotation Guidelines," Center for Computational Language and Education Research, Institute of Cognitive Science, Nov. 14, 2012, pp. 1-55.

Choi et al., "Transition-based Semantic Role Labeling Using Predicate Argument Clustering," Association for Computational Linguistics, Proceedings of the ACL Workshop on Relational Models of Semantics (RELMS 2011), Jun. 23, 2011, pp. 37-45.

Elman, J., "Finding Structure in Time," Cognitive Science, vol. 14, 1990, pp. 179-211.

Fader et al., "Identifying Relations for Open Information Extraction," Association for Computational Linguistics, Proceedings of the Conference on Empirical Methods in Natural Language Processing, Jul. 27-31, 2011, pp. 1535-1545.

Fitzgerald et al., "Semantic Role Labeling with Neural Network Factors," Association for Computational Linguistics, Proceedings of the Conference on Empirical Methods in Natural Language Processing, Sep. 17-21, 2015, pp. 960-970.

Foland et al., "Dependency-Based Semantic Role Labeling using Convolutional Neural Networks," Proceedings of the Fourth Joint Conference on Lexical and Computational Semantics (SEM 2015), Jun. 4-5, 2015, pp. 279-288.

Gildea et al., "Automatic Labeling of Semantic Roles," Association for Computational Linguistics, Computational Linguistics, vol. 28, No. 3, Sep. 2002, pp. 1-45.

Hajic et al., "The CoNLL-2009 Shared Task: Syntactic and Semantic Dependencies in Multiple Languages," Association for Computational Linguistics, Proceedings of the Thirteenth Conference on Computational Natural Language Learning (CoNLL): Shared Task, Jun. 2009, pp. 1-18.

Hochreiter et al., "Long Short-Term Memory," Neural Computation, vol. 9, No. 8, 1997, pp. 1-32.

Johansson et al., "Dependency-based Semantic Role Labeling of PropBank," Association for Computational Linguistics, Proceedings of the Conference on Empirical Methods in Natural Language Processing, Oct. 2008, pp. 69-78.

Li et al., "Joint Syntactic and Semantic Parsing of Chinese," Association for Computational Linguistics, Proceedings of the 48th Annual Meeting of the Association for Computational Linguistics, Jul. 11-16, 2010, pp. 1108-1117.

Liu et al., "Semantic Role Features for Machine Translation," Proceedings of the 23rd International Conference on Computational Linguistics (Coling 2010), Aug. 2010, pp. 716-724.

Lo et al., "Improving machine translation into Chinese by tuning against Chinese MEANT," In International Workshop on Spoken Language Translation 335 (IWSLT 2013), 2013, 8 pages, retrieved from https://home.cse.ust.hk/~dekai/library/WU_Dekai/LoBeloucifWu_Iwslt2013.pdf.

Maqsud et al., "Nerdle: Topic-Specific Question Answering Using Wikia Seeds," Proceedings of COLING 2014, the 25th International Conference on Computational Linguistics: System Demonstrations, Aug. 23-29, 2014, pp. 81-85.

Palmer et al., "The Proposition Bank: An Annotated Corpus of Semantic Roles," Association for Computational Linguistics, Computational Linguistics, vol. 31, No. 1, Mar. 2005, pp. 71-105.

Paszke et al., "Automatic differentiation in PyTorch," 31st Conference on Neural Information Processing Systems (NIPS 2017), 2017, pp. 1-4.

Pennington et al., "GloVe: Global Vectors for Word Representation," Association for Computational Linguistics, Proceedings of the Conference on Empirical Methods in Natural Language Processing (EMNLP), Oct. 25-29, 2014, pp. 1532-1543.

(56) References Cited

OTHER PUBLICATIONS

Pradhan et al., "Semantic Role Chunking Combining Complementary Syntactic Views," Association for Computational Linguistics, Proceedings of the 9th Conference on Computational Natural Language Learning (CoNLL), Jun. 2005, pp. 217-220.

Punyakanok et al., "The Importance of Syntactic Parsing and Inference in Semantic Role Labeling," Association for Computational Linguistics, Computational Linguistics, vol. 34, No. 2, Jun. 2008, pp. 257-287.

Roth et al., "Neural Semantic Role Labeling with Dependency Path Embeddings," Association for Computational Linguistics, Proceedings of the 54th Annual Meeting of the Association for Computational Linguistics, Aug. 7-12, 2016, pp. 1192-1202.

Shen et al., "Using Semantic Roles to Improve Question Answering," Association for Computational Linguistics, Proceedings of the Joint Conference on Empirical Methods in Natural Language Processing and Computational Natural Language Learning, Jun. 2007, pp. 12-21.

Swayamdipta et al., "Greedy, Joint Syntactic-Semantic Parsing with Stack LSTMs," Association for Computational Linguistics, Proceedings of the 20th SIGNLL Conference on Computational Natural Language Learning (CoNLL), Aug. 7-12, 2016, pp. 187-197.

Zhou et al., "End-to-end Learning of Semantic Role Labeling Using Recurrent Neural Networks," Association for Computational Linguistics, Proceedings of the 53rd Annual Meeting of the Association for Computational Linguistics and the 7th International Joint Conference on Natural Language Processing, Jul. 26-31, 2015, pp. 1127-1137.

Button et al., "Reinforcement Learning: An Introduction," The MIT Press, 2014, pp. 1-338.

Office Action from Chinese Patent Application No. 202010528591.5, dated Feb. 27, 2024, 8 pages.

Office Action from Chinese Patent Application No. 202010528591.5, dated Jul. 20, 2024, 13 pages.

\* cited by examiner

PREDICTING FUNCTIONAL TAGS OF SEMANTIC ROLE LABELING

BACKGROUND

The present invention relates to textual analysis, and more specifically, this invention relates to performing semantic role labeling within natural language processing.

Semantic Role Labeling (SRL), also known as shallow semantic parsing, is an important task in Natural Language Processing (NLP) related to understanding the meaning of a sentence. It aims at answering such question that "who does what with whom, when and where, how and why" by identifying such information as functional tags. SRL provides useful features that can benefit a wide variety of applications, such as information extraction, question answering (QA), machine translation, and so on. However, current labeling implementations identify functional tags in an inefficient manner, since such implementations focus on identifying core arguments within input textual data.

SUMMARY

A computer-implemented method according to one embodiment includes receiving, at a scheduler, a training data instance and a target instance; generating, by the scheduler, an input sequence from the training data instance and the target instance; sending the input sequence from the scheduler to an encoder; mapping, by the encoder, the input sequence to a feature vector; sending the feature vector from the encoder to the scheduler; sending the feature vector from the scheduler to a predictor; and mapping, by the predictor, the feature vector to a class vector to create a label for the target instance.

According to another embodiment, a computer program product for predicting functional tags of semantic role labeling includes a computer readable storage medium having program instructions embodied therewith, where the program instructions are executable by a processor to cause the processor to receive, at a scheduler utilizing the processor, a training data instance and a target instance; generate, by the scheduler utilizing the processor, an input sequence from the training data instance and the target instance; send the input sequence from the scheduler to an encoder, utilizing the processor; map, by the encoder utilizing the processor, the input sequence to a feature vector; send the feature vector from the encoder to the scheduler, utilizing the processor; send the feature vector from the scheduler to a predictor, utilizing the processor; and map, by the predictor utilizing the processor, the feature vector to a class vector to create a label for the target instance.

According to another embodiment, a system includes a processor, and logic integrated with the processor, executable by the processor, or integrated with and executable by the processor, where the logic is configured to receive, at a scheduler, a training data instance and a target instance; generate, by the scheduler, an input sequence from the training data instance and the target instance; send the input sequence from the scheduler to an encoder; map, by the encoder, the input sequence to a feature vector; send the feature vector from the encoder to the scheduler; send the feature vector from the scheduler to a predictor; and map, by the predictor, the feature vector to a class vector to create a label for the target instance.

Other aspects and embodiments of the present invention will become apparent from the following detailed description, which, when taken in conjunction with the drawings, illustrate by way of example the principles of the invention.

DETAILED DESCRIPTION

Figure 1:
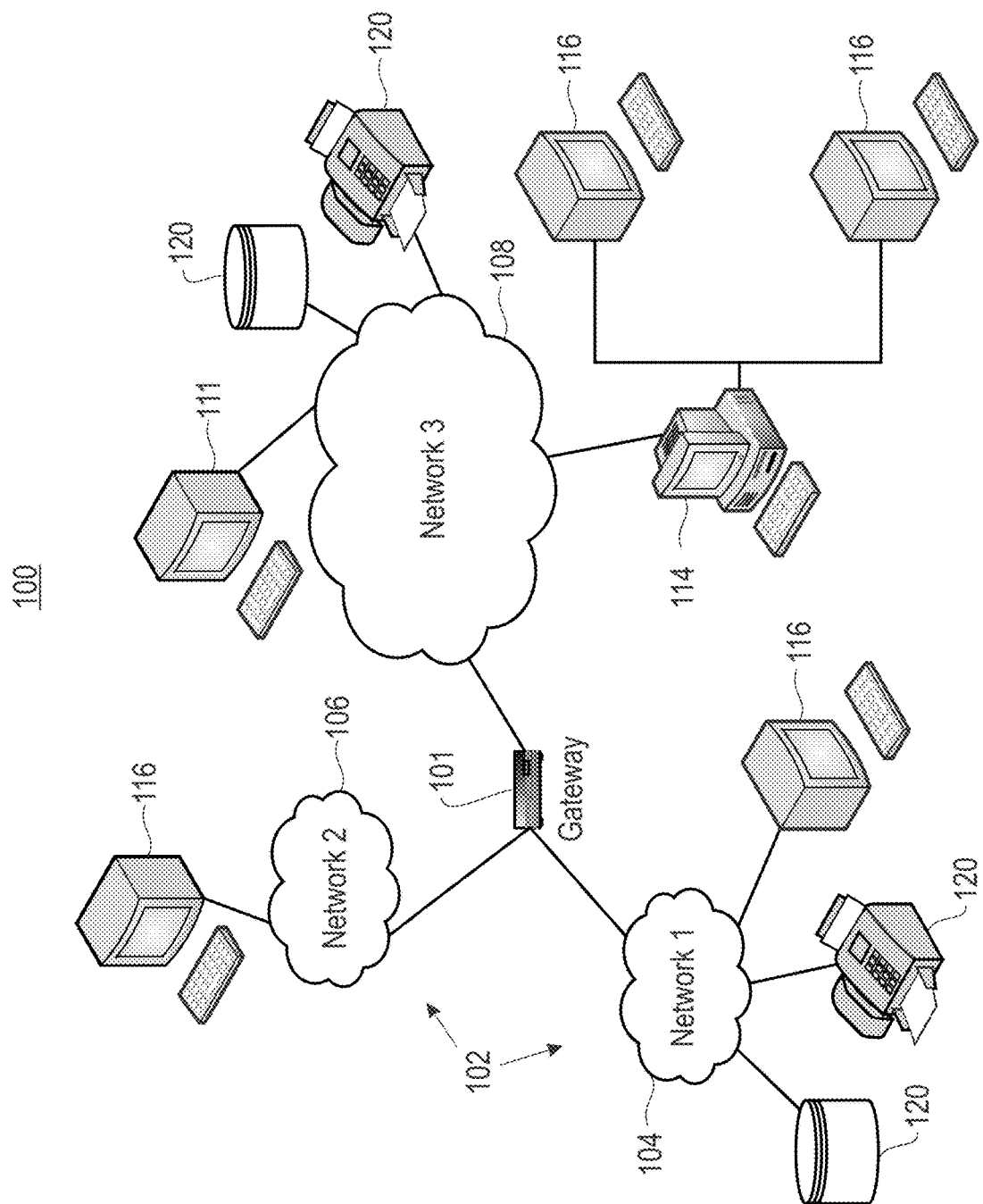
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for predicting functional tags of semantic role labeling.

In one general embodiment, a computer-implemented method includes receiving, at a scheduler, a training data instance and a target instance; generating, by the scheduler, an input sequence from the training data instance and the target instance; sending the input sequence from the scheduler to an encoder; mapping, by the encoder, the input sequence to a feature vector; sending the feature vector from the encoder to the scheduler; sending the feature vector from the scheduler to a predictor; and mapping, by the predictor, the feature vector to a class vector to create a label for the target instance.

In another general embodiment, a computer program product for predicting functional tags of semantic role labeling includes a computer readable storage medium having program instructions embodied therewith, where the program instructions are executable by a processor to cause the processor to receive, at a scheduler utilizing the processor, a training data instance and a target instance; generate, by the scheduler utilizing the processor, an input sequence from the training data instance and the target instance; send the input sequence from the scheduler to an encoder, utilizing the processor; map, by the encoder utilizing the processor, the input sequence to a feature vector; send the feature vector from the encoder to the scheduler, utilizing the processor; send the feature vector from the scheduler to a predictor, utilizing the processor; and map, by the predictor utilizing the processor, the feature vector to a class vector to create a label for the target instance.

In another general embodiment, a system includes a processor, and logic integrated with the processor, executable by the processor, or integrated with and executable by the processor, where the logic is configured to receive, at a scheduler, a training data instance and a target instance; generate, by the scheduler, an input sequence from the training data instance and the target instance; send the input sequence from the scheduler to an encoder; map, by the encoder, the input sequence to a feature vector; send the feature vector from the encoder to the scheduler; send the feature vector from the scheduler to a predictor; and map, by the predictor, the feature vector to a class vector to create a label for the target instance.

FIG. illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
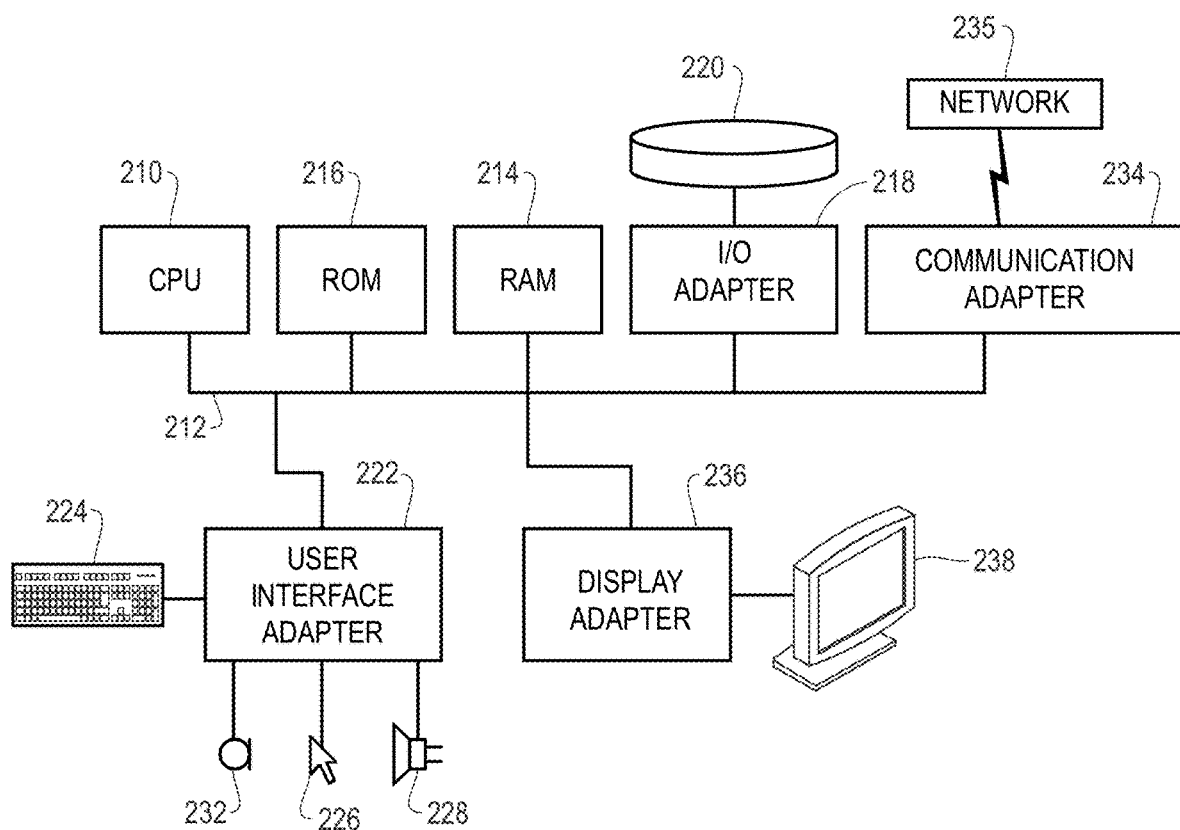
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. This figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network), and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
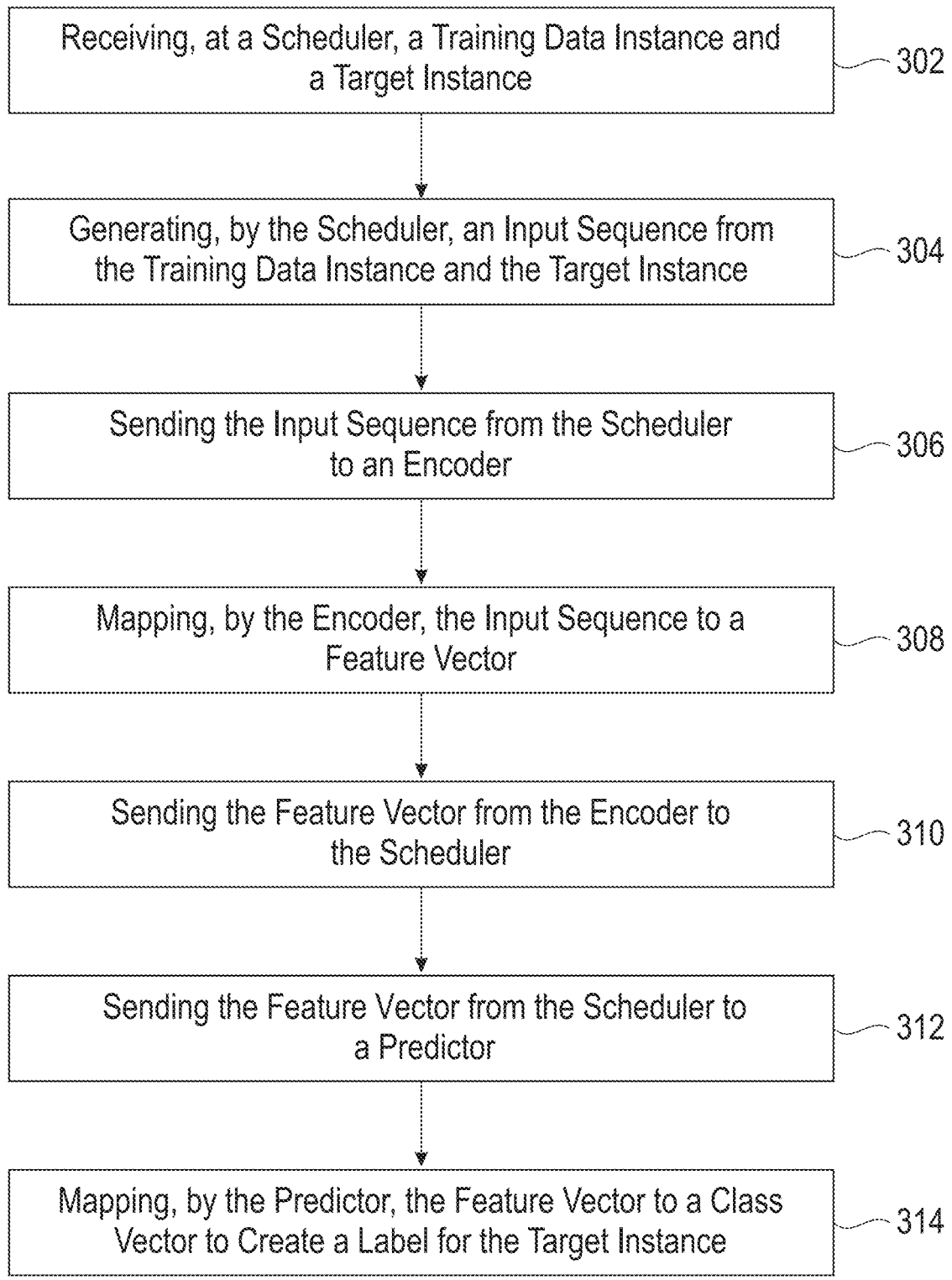
FIG. 3 illustrates a method for predicting functional tags of semantic role labeling, in accordance with one embodiment of the present invention.

Now referring to FIG. 3, a flowchart of a method 300 is shown according to one embodiment. The method 300 may be performed in accordance with the present invention in any of the environments depicted in FIGS. 1, 2, 5, 6, and 7, among others, in various embodiments. Of course, greater or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a training data instance and a target instance are received at a scheduler. In one embodiment, the training data instance may include a textual sentence represented as a dependency tree. In another embodiment, the training data instance may include a plurality of identified and labeled dependencies.

Additionally, in one embodiment, the target instance may include a portion of the dependency tree (e.g., a subtree within the dependency tree, a portion of the sentence, etc.). In another embodiment, the scheduler may strategically invoke an encoder and a predictor to perform one or more operations.

Further, method 300 may proceed with operation 304, where an input sequence is generated by the scheduler from the training data instance and the target instance. In one embodiment, generating the input sequence may include parsing the training data instance and the target instance by the scheduler. For example, the input sequence may be generated by the scheduler based on the parsing. In another example, the input sequence may include a restructured training data instance and target instance that is understandable by an encoder.

Further still, in one embodiment, the scheduler may include one or more of logistic regression, a support vector machine (SVM), a fully connected neural network, etc. In another embodiment, the input sequence may be generated based on a predetermined strategy.

For example, the strategy may include a cold start strategy. For instance, the scheduler may adopt a uniform distribution to generate the input sequence. In another example, the strategy may include a warmup strategy. For instance, the scheduler may adopt an epsilon-greedy method to generate the input sequence. In yet another example, the strategy may include a heat convergence strategy. For instance, the scheduler may adopt a maximum-likelihood action to generate the input sequence.

Also, method 300 may proceed with operation 306, where the input sequence is sent from the scheduler to an encoder. In one embodiment, the scheduler may invoke the encoder by sending the input sequence to the encoder. In another embodiment, the encoder may include one or more of a recurrent neural network (RNN), a hidden Markov model, long-short term memory, etc.

In addition, method 300 may proceed with operation 308, where the input sequence is mapped to a feature vector by the encoder. In one embodiment, the feature vector may include one or more features of the target instance within the training data instance.

Furthermore, method 300 may proceed with operation 310, where the feature vector is sent from the encoder to the scheduler. Further still, method 300 may proceed with operation 312, where the feature vector is sent from the scheduler to a predictor. In one embodiment, the scheduler may invoke the predictor by sending the feature vector to the predictor. In another embodiment, the feature vector may be conditionally sent to the predictor, based on one or more criteria.

Further still, in one embodiment, the scheduler may determine whether the feature vector is sufficient to invoke the predictor. For example, the feature vector may be sent to the predictor in response to determining that the feature vector is sufficient to invoke the predictor. In another embodiment, the feature vector may not be sent to the predictor in response to determining that the feature vector is not sufficient to invoke the predictor.

Also, in one embodiment, the scheduler may map the feature vector to an action ranking vector. In another embodiment, the predictor may include one or more of logistic regression, an SVM, a fully-connected neural network, etc.

Additionally, method 300 may proceed with operation 314, where the feature vector is mapped to a class vector by the predictor to create a label for the target instance. For example, the class vector may include a correlation between predetermined features and predetermined classes or labels. In one embodiment, the label may include a predicted nonfunctional label. For example, the predicted nonfunctional label may include a prediction as to whether the target instance is a functional tag. In another example, a functional tag may include a portion of a sentence that includes details about an action being performed within the sentence (e.g., location, time, details, etc.).

In this way, the predictor may create a label for the target instance that indicates whether the target instance is a functional tag.

Further, in one embodiment, the label may be compared to a predetermined training label to determine a difference between the label and the predetermined training label. For example, the predetermined training label may be supplied to the scheduler with the training data instance and the target instance. In another example, the predetermined training label may include a ground truth label for the training data instance. In yet another example, the predetermined training label may include a predetermined label indicating whether the target instance is a functional tag.

Further still, in one embodiment, the predictor may be adjusted, based on the difference. For example, the mapping performed by the predictor may be adjusted to reduce or eliminate the difference. In this way, the predictor may be trained, utilizing the difference.

Also, in one embodiment, the difference may be sent from the predictor to the scheduler. In another embodiment, the scheduler may be adjusted, based on the difference. For example, the invocation of the encoder and the predictor by the scheduler may be adjusted to reduce or eliminate the difference. In this way, reinforcement learning may be utilized to refine the scheduler during training of the scheduler, predictor, and encoder.

In addition, in one embodiment, a model may be applied to the adjusted scheduler. For example, the model may include a sentence represented as a dependency tree, and an identified subtree within the dependency tree. In another example, the adjusted scheduler may generate an input sequence from the model. The adjusted scheduler may then send the input sequence to an encoder. The encoder may then map the input sequence to a feature vector, which is then returned to the adjusted scheduler. The adjusted scheduler may send the feature vector to the adjusted predictor. The adjusted predictor may then map the feature vector to a class vector to create a label for the identified subtree (e.g., whether the subtree is functional or non-functional, etc.).

In this way, an analysis that specifically focuses on an identification of functional tags may be trained and applied to sentences represented as dependency trees. This may improve the prediction of functional tags within these sentences, which may reduce an amount of processing necessary to perform such prediction. This may in turn improve a performance of one or more computing devices performing such prediction.

Figure 4:
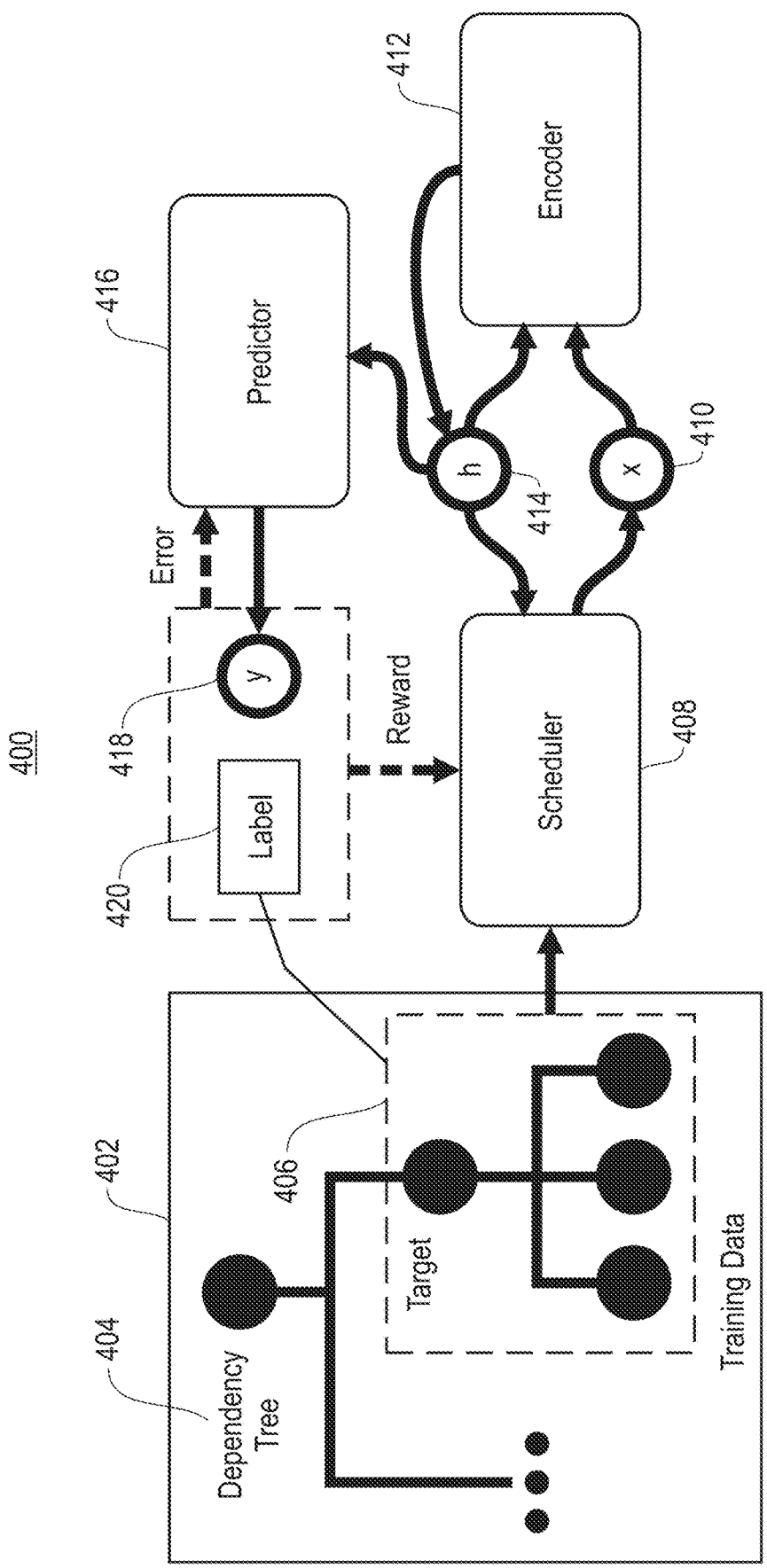
FIG. 4 illustrates an exemplary semantic role labeling environment, in accordance with one embodiment of the present invention.

FIG. 4 illustrates an exemplary semantic role labeling environment 400, according to one embodiment. As shown, training data 402 including a dependency tree 404 and a target 406 are input into a scheduler 408. The scheduler 408 creates an input sequence 410 that is sent to an encoder 412.

Additionally, the encoder 412 maps the input sequence 410 to a feature vector 414, which is then returned to the scheduler 408. The scheduler 408 analyzes the feature vector 414, and upon determining that the feature vector 414 is sufficient to invoke the predictor 416, the scheduler 408 sends the feature vector 414 to the predictor 416.

Further, in response to receiving the feature vector 414, the predictor 416 maps the feature vector 414 to a class vector to create a label 418 for the target 406. This created label 418 is compared to a ground truth label 420 for the target 406, and any error is sent to both the predictor 416 and the scheduler 408 so that they may be adjusted to minimize future errors.

Figure 5:
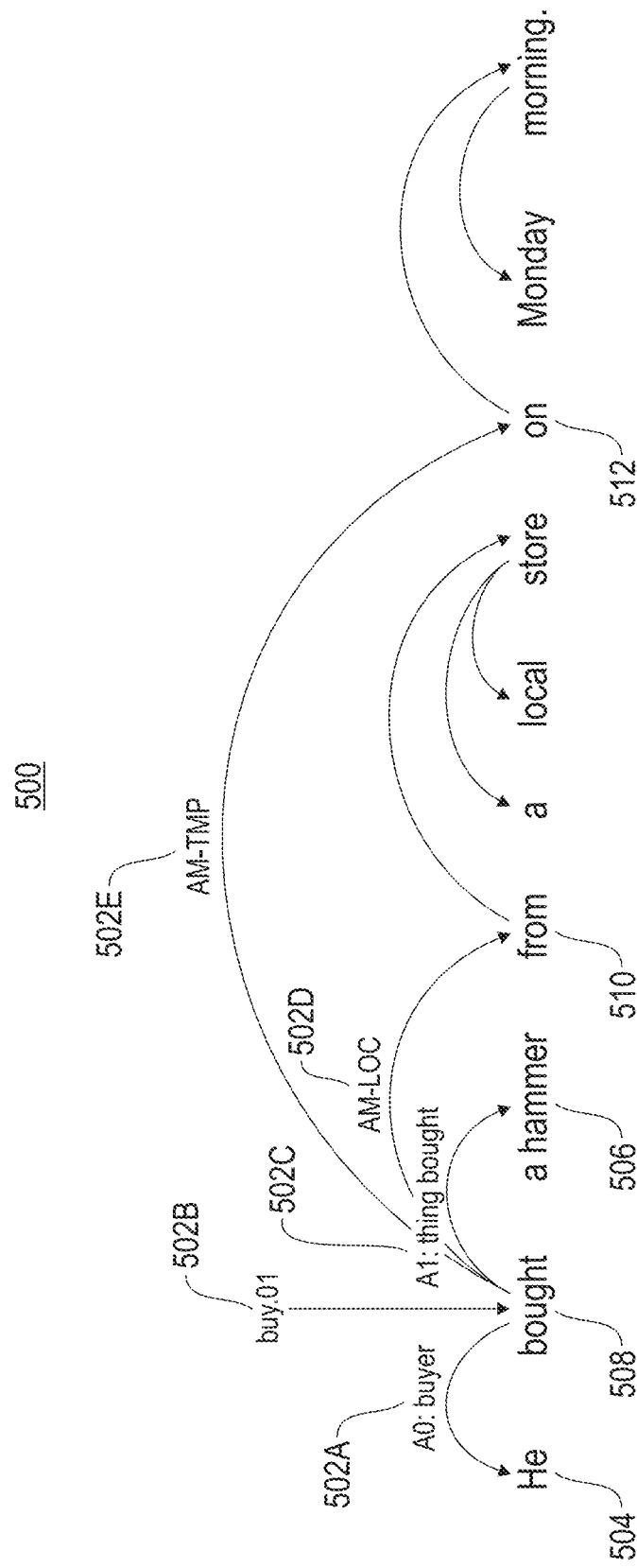
FIG. 5 illustrates semantic labels for an exemplary sentence, in accordance with one embodiment of the present invention.

Coordinate Neural Network: Combining Recurrent Neural Network and Reinforcement Learning to Predict Functional Tags of Semantic Role Labeling The PropBank is a labeling scheme for English. It annotates a sentence with three types of labels, predicates, numbered arguments, and functional tags. Each predicate (usually a verb) denotes a major action in the sentence, and each numbered argument is an associated argument of the center predicate. Particularly, there is a frame file listing all possible numbered arguments for each predicate. Finally, the functional tags are labels for modifiers of the predicates and provide auxiliary information such as time, location, manner, and reason etc. FIG. 5 shows semantic labels 502A-E for the sentence "He bought a hammer from a local store on Monday morning." As can be seen, the "He" 504 and "a hammer" 506 are arguments of the predicate (i.e., "bought" 508 in this case), and the "from . . . " 510 and "on . . . " 512 are functional tags, representing the location (AM-LOC) 502D and time (AM-TMP) 502E respectively.

General methods may be used to predict all semantic roles. However, not all semantic roles are created equal. Functional tags are much more flexible than predicates and numbered arguments. Firstly, there is no predefined frame for functional tags. Therefore, one cannot rely on frame files as a knowledge base to help make a prediction. Furthermore, functional tags may be missing in a sentence since they only provide related information. The resulting low frequency of occurrence makes it hard for instance-based methods to find similar cases. Finally, the position of functional tags is highly variant in a sentence. For example, the sentence "On Monday morning he bought a hammer" is not different from the one "He bought a hammer on Monday morning". Similarly, the sentences "She picks a coin out of the pocket" and "She picks out of the pocket a coin" both make sense. Such flexibility affects the effectiveness of position-related features in training classifiers. Also, it impacts the end-to-end model that generates global sequential features to make a prediction.

We argue that special methods should be adopted to handle functional tags. In this work we develop a model, named Coordinate Neural Network (CoNN), to predict functional tags. CoNN treats the prediction task as playing a puzzle game, where the player needs to collect fragmented hints and make the final guess. Particularly, given a parsed dependency tree, the model starts with the root token of target terms and randomly travels either along the child or the parent, depending on its learned "sense". Once it feels confident with collected information, it stops to make a prediction. The path navigating, information collecting, and decision making are done by different components of CoNN. Although having different local objective functions and partial control of the whole process, they coordinate with each other to accomplish the prediction task.

To illustrate how the model works, we use the example in FIG. 5. To predict the functional tag for "on Monday morning", CoNN starts with the token "on" 512. It feels the information so far is insufficient and determines to move on to its child. In reality, the word "on" 512 could either represent location (AM-LOC) 502D or time (AM-TMP) 502E, depending on following terms. Reaching token "morning", CoNN updates the information and determines to stop and predict the tag since "morning" is a strong signal of AM-TMP 502E. Similarly, to predict the functional tag for "from a local store", CoNN starts with the root token "from" 510. With this information, it determines to move on because in the trained data this token could represent either direction (AM-DIR) or location (AM-LOC) 502D, depending on the context. Rather than going to a child, it determines to visit the parent, which is the token "bought" 508. Then it feels confident and predicts the role label, since it is of low probability that the predicate "buy" is associated with a direction tag. It is worth noting that when implemented, the model could not have such human-readable rules. Instead, it encodes all visited tokens to a latent feature vector and makes decisions based on that.

The contribution disclosed herein is threefold. Firstly, we isolate the prediction of a functional tag from a common SRL task and propose a model to solve it. We experimentally demonstrate that our method achieves higher prediction accuracy in functional tags than those focusing on all semantic roles. Also, we exploit reinforcement learning and customize the Q-learning technique to wisely refine local information to help prediction of functional tags. Compared with a method that scans the whole sentence for global feature, it is more efficient and requires a less complex model. Finally, we conduct extensive experiments to study the impact of different model structures and configurations on the performance.

CoNN Structure

The CoNN consists of three major components, i.e., scheduler, encoder, and predictor. The scheduler is responsible for generating input sequence from the parsed dependency tree. The encoder is to convert an input sequence to a hidden feature vector and finally the predictor is to make predictions of its semantic role label. The pipeline of this prediction process 600 is shown in FIG. 6.

Figure 6:
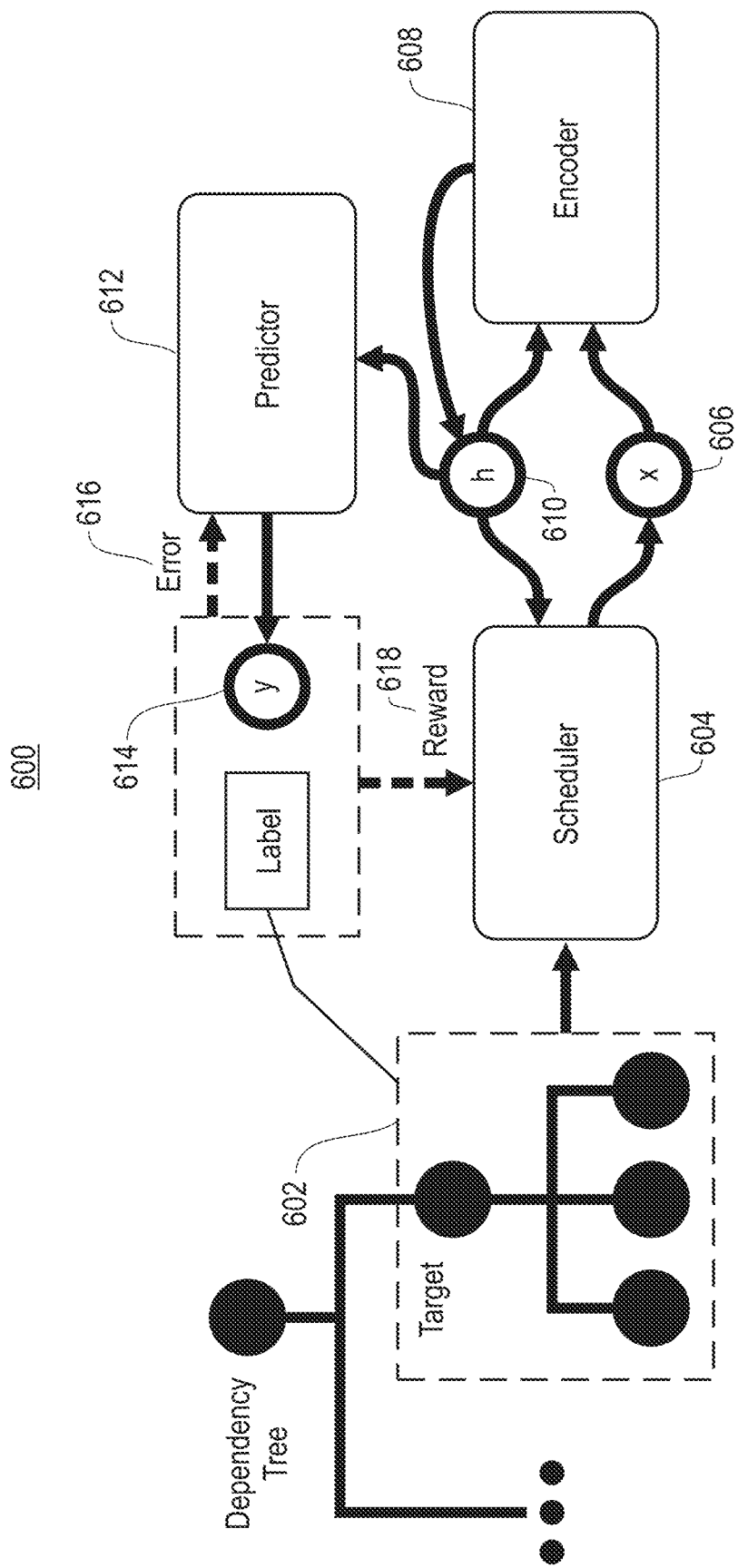
FIG. 6 illustrates a pipeline of a prediction process, in accordance with one embodiment of the present invention.

As shown in FIG. 6, the pipeline of prediction starts with a target sub-tree 602, from which the scheduler 604 determines the token x 606 to be passed to the encoder 608. Receiving the token x 606, the encoder 608 combines it with the current hidden state and maps it to a new one h 610. Then based on the updated hidden state, the scheduler 604 makes decisions on how to proceed, i.e., either choose more tokens to feed to the encoder 608 (until no more available tokens) or stop. When token-feeding stops, the predictor 612 makes a prediction y 614 on the semantic role label. During training, the error of prediction 616 is back-propagated to both the predictor 612 and the encoder 608 to adjust their parameters. In the meantime, the error is converted to some reward score 618 measuring the quality of generated token sequences. This score 618 is passed back to the scheduler 604 to optimize its strategy of token generation. Additionally, the solid arrow shows the data feeding during prediction while the dashed one indicates the feedback during training.

Model of Scheduler

Figure 7:
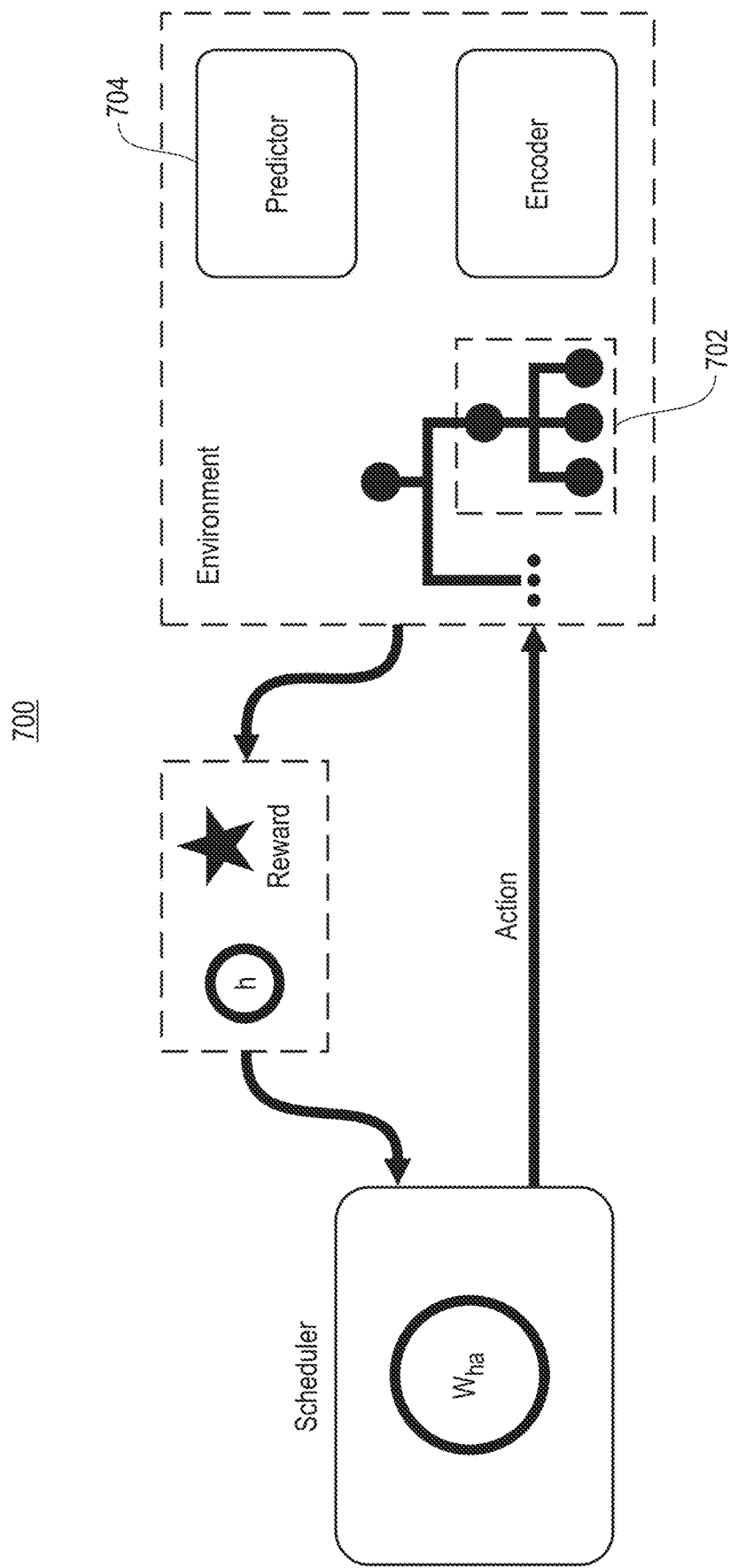
FIG. 7 illustrates the pipeline from FIG. 6 redrawn by picking out a scheduler and encapsulating other components in a black box environment, in accordance with one embodiment of the present invention.

The role of scheduler is to wisely schedule the input sequence so that ultimately the predictor can give correct prediction of the semantic role label. To the scheduler, the running mechanisms of encoder and predictor are completely transparent. FIG. 7 illustrates the pipeline from FIG. 6 redrawn by picking out a scheduler and encapsulating other components in a black box environment. The result represents a classic scenario of reinforcement learning.

For each target instance, we set the initial hidden state as the one encoded with the root token of the corresponding target dependency tree. And the action space consists of i) get parent ii) get child and iii) stop. The first two means get the parent/child token of the current one in the dependency tree 702 and the last one is to activate the predictor 704 to give predictions based on the most recent hidden state. Particularly, when a node has multiple children, the visiting sequence is constrained to the order of their appearances in the original sentence. Finally, for the rewarding rule, there is 0 instant reward for generating new tokens (action i and ii) and 1/−1 for stop (action iii), where the value depends on whether the prediction is correct or not.

Formally, let $w_{ha}$ denote the action ranking parameter and give a hidden state h, the probability of selecting one particular action a from action space $\mathbb{A}$ is defined as the softmax of all, as shown in Equation (1) below:

$$P(a \mid w_{ha}, h, \mathbb{A}) = \frac{\exp(h^T \cdot w_{ha}(:,a))}{\sum_{a' \in \mathbb{A}} \exp(h^T \cdot w_{ha}(:,a'))} \quad (1)$$

where the $h^T$ represents the transpose of the vector and $w_{ha}(:;a)$ stands for the ath column of the matrix. The goal of the scheduler is to maximize the expected reward as time passes via adjusting the value of parameter $w_{ha}$. Generally, the objective function is defined as the sum of instant reward and the discounted future ones, as shown in Equation (2) below:

$$\mathcal{L}_{scheduler} = \max_{w_{ha}} \sum_{t=0}^{\infty} E(\gamma^t \cdot r_{t+1} \mid w_{ha}, h_t) \quad (2)$$

where the $\gamma \in [0, 1]$ is a discount value for future rewards and is usually set to be 0.99. To effectively optimize the scheduler, we can apply a regular Q-learning technique to minimize the difference between estimated cumulative reward from time t and the actual one at time t+1 plus the expected future cumulative rewards:

$$w_{ha}^* = \underset{w_{ha}}{\operatorname{argmin}} \sum_{t=0}^{\infty} \left\{ Q(a_t \mid w_{ha}, h_a) - \left( r_t + \gamma \cdot \max_a Q(a \mid w_{ha}, h_{t+1}) \right) \right\}^2 \quad (3)$$

where the $r_t$ stands for the instant reward obtained after taking action $a_t$ at hidden state $h_t$. The Q evaluation function can be simply defined as the action value estimation without softmax:

$$Q(a \mid w_{ha}, h) = h^T \cdot w_{ha}(:,a) \quad (4)$$

However, short-cuts can be taken to accelerate the learning process due to the special setting of semantic role prediction.

Model of Encoder and Predictor

In this section we describe the structure of both encoder and predictor as the two behave as a whole. Specifically, the encoder is an Elman recurrent neural network and the predictor is a feedforward neural network. For each new token $x_t$ fed by the scheduler, the encoder updates the hidden state with input-to-hidden matrix $w_{ih}$ and hidden-to-hidden matrix $w_{hh}$, as follows:

$$h_{t+1} = \tan h(x_t^T \cdot w_{ih} + h_t^T \cdot w_{hh} + b_h) \quad (5)$$

where $b_h$ is a scalar of bias and tan h( ) is a hyperbolic tangent function. The predictor is only activated at the final input token $x_T$ and makes prediction based on the most recent hidden state $h_T$. Specifically, the output $y_T$ is a vector whose dimension is the same as the total number of candidate labels. Similar to Equation (1), the softmax normalization function is applied to obtain the likelihood of each possible choice. Note that for intermediate hidden states $\{h_t \mid 1 \leq t < T\}$, the predictor can also produce "virtual output" $y_t$. These outputs do not affect the final prediction and are only used to optimize the scheduler.

The encoder and predictor work as a whole and share the same goal, i.e., maximize the number of correct predictions. Mathematically, it is achieved by maximizing the expected log-likelihood of the true label given a distribution of input sequence. Formally, given a data set of labeled dependency trees $\mathbb{D}$, let $\theta_e$, $\sigma_p$ denote parameters of encoder and predictor, respectively, so that the objective function can be written as in Equation (6):

$$\mathcal{L}_{encoder\ \&\ predictor} = \quad (6)$$

$$\max_{\theta_e, \theta_p} \sum_{(d,l) \in \mathbb{D}} E_{x_1,\ldots,x_T \sim Distr(d, w_{ha}, \theta_e)}[\log P(l \mid x_1, \ldots, x_T, \theta_e, \theta_p)]$$

The d, l represents the target instance and its semantic role label. The Distr(d, $w_{ha}$, $\theta_e$) represents the distribution of input sequences generated by the scheduler. Given an instance, the generated input token sequence may differ due to the random strategy of action selection as defined in Equation (1). Finally, the probability of the real label $P(l \mid \cdot)$ is the lth element value of the output vector $y_T$.

CoNN Learning

In this section we introduce the model inference. Specifically, we first describe the revised Q-learning technique to optimize the scheduler. Then we talk about the training of the whole model. For the encoder and the predictor, the training exploits standard back-propagation.

Customized Q-Learning

As shown earlier in Equation (2), the key idea of Q-learning is to use the instant reward at time t and the estimated future cumulative reward from t+1 with discounts to adjust the estimation at time t. More generally, one can keep track of T time steps of actions as well as hidden states and make a batch of adjustments. In this case, the error gradient of estimation is represented in Equation (7):

$$\nabla Q(h_t, a_t) = Q(h_t, a_t) - \left( r_t + \sum_{i=1}^{\tau} \gamma^i \max \left\{ r_{t+i}, \max_{a \neq a_{t+i}} Q(h_{t+i}, a) \right\} \right) \quad (7)$$

Here for simplicity, we omit the $w_{ha}$ parameter in the Q evaluation function.

As can be seen, an accurate estimation for hidden state $h_t$ highly relies on a full traverse of all possible $h_{t+1}$. This is a general reinforcement learning technique for games of unbounded rewards. In our case, however, the instant reward is either 0, 1 or −1, and thus the Q-function is strictly bounded in [−1; 1], given the discounted parameter $\gamma$ is nonnegative and no bigger than 1. Furthermore, the goal of the scheduler is to generate a good input sequence where the encoder and predictor have a high prediction accuracy. As a result, the scheduler needs to avoid hidden states with negative rewards. This inclination provides the opportunity to customize general Q-learning techniques. Finally, for each hidden state, the scheduler can activate the predictor to obtain the virtual output for a real instant reward. Such mechanism can also help increase the speed of learning.

In summary, we design two rules during scheduler training, listed below:

Reward bound. This rule is to restrict the estimated rewards to be within the range of −1 and 1 when propagated to the last hidden state.

Full bad news. This rule applies no discount on a negative instant reward to increase the probability of avoiding the "failure hidden state" for the scheduler.

Table 1 illustrates the learning algorithm.

TABLE 1

SCHEDULER TRAINING

```
1:  procedure TRAINSCHEDULER(l, {h_t, a_t| 0 ≤ t ≤ T})
2:      r_t ← unknown
3:      for t ∈ [T, 0] do
4:          activate Predictor for prediction î
5:          r ← 1 if l == î otherwise −1
6:          update Q(h_t, a_stop) with r
7:          if a_t ≠ a_stop ∧ r_t is not unknown then
8:              update Q(h_t, a_t) with r_t
9:          end if
10:         if r_t ≠ −1 then              ▷ Rule of full bad news
11:             r_t ← r_t · γ
12:         end if
13:         r_t ← max (r_t,max_{a≠a_t} Q(h_t, a) · γ)
14:         r_t ← max ( −1,min(1, r_t))   ▷ Rule of reward bound
15:     end for
16: end procedure
```

As shown in Table 1, given a sampled hidden state sequence from some data instance and its real label, the algorithm first inversely scans each hidden state $h_t$ and the taken $a_t$. For each state, it activates the predictor to obtain the instant reward if stopping at that hidden state. This value is certain and thus directly used to update the Q-function (line 6). Then for the real taken action $a_t$, it updates the Q-function with $r_t$, which records the estimated best reward at the next time stamp (see line 13 for the definition). Next, the algorithm estimates the discounted best reward at the current time stamp and propagates backforward. Particularly, the discount is only applied if current propagated reward is not −1 (line 10 to 11). This is because $r_t = -1$ indicates the failure of a prediction in the future and should be avoided. Finally, the estimated reward is bounded within −1 and 1 (line 14) to match the setting.

Training of the Whole Model

Although the scheduler, encoder and predictor have different objective functions defined in Equation (2) and (6), they mutually impact each other via hidden state and prediction performance. The training is conducted alternatively. The encoder and predictor optimize themselves to improve prediction accuracy based on the distribution of input token sequences generated by the scheduler. Then with a fixed encoder and predictor, the scheduler learns which sequence is "favored" by the predictor and adjusts its parameters toward generating biased sequences. As the distribution of input sequences changes, the encoder and predictor again make adjustments and adapt to the new sequence.

For a scheduler to generate a sequence, we sequentially adopt three strategies, i.e., uniform random, biased random, and maximum. The first strategy (uniform random) randomly selects actions to generate sequences without regarding the action evaluation function or the hidden state. It is used during early training stages (cold start) when all model parameters are randomly initialized. After passing the early phase, uniform random is gradually switched to a biased random strategy, which is to select an action based on the action evaluation function as defined in Equation (1). Finally, in the final phase, the scheduler uses the maximum strategy (i.e., take the action with highest evaluation score). This strategy fixes the resulting sequence and the performance of the whole model fluctuates less and converges sooner.

Table 2 illustrates the pseudo-code of the learning algorithm.

TABLE 2

MODEL LEARNING

```
1:  procedure TRAIN(𝔻)
2:      for i ∈ [1, I] do
3:          sample 𝔻̃ ⊂ 𝔻 ∧ |𝔻̃| = N
4:          if i ≥ I* then
5:              ℍ ← Gen(𝔻̃, max) ∧ |ℍ| = N          ▷ Heat converge
6:          else if random(0, 1) < 1/(α·i) then
7:              ℍ ← Gen(𝔻̃, uniform) ∧ |ℍ| = N · m   ▷ Cold-start
8:          else
9:              ℍ ← Gen(𝔻̃, biased) ∧ |ℍ| = N · m    ▷ Warm-up
10:         end if
11:         train encoder & predictor with ℍ
12:         train scheduler with ℍ                  ▷ Algorithm 1
13:     end for
14: end procedure
```

Given a data set $\mathbb{D}$, the learning takes I iterations. For each iteration, a subset of data $\tilde{\mathbb{D}}$ with size $N \ll |\mathbb{D}|$ is randomly sampled. Then it generates input sequences, denoted as the function Gen( ). Here the second parameter is the selection strategy with values of uniform, random or max, corresponding to three strategies mentioned above.

Specifically, when the iteration exceeds some predetermined threshold $1 < I^* < I$, the learning enters a heat-converge phase and the maximum strategy is used. Otherwise, a random number from 0 to 1 random(0; 1) is chosen to select either a uniform or biased strategy. One may notice that the decision bound is $$\frac{1}{\alpha i},$$

where the $\alpha$ is a non-negative variable affecting the speed of warm-up and i is the iteration number. In general, as the iteration increases, it is more likely to select a biased strategy. Also note that for a maximum strategy, only one input sequence is generated for each data instance while it is m for the other two. For a data instance, the generated input sequence is always the same with a maximum strategy and therefore one input sequence is sufficient. Finally, the generated sequences ℍ are fed to train the encoder, predictor and scheduler alternatively.

In one embodiment, the Encoder, Predictor, and Scheduler are trained iteratively. The whole training has three phases based on scheduler status:

Cold-start: scheduler randomly "schedules" sequence

Warm-up: the scheduler reduces the randomness, making the distribution of generated sequence more consistent Heat-converge: the scheduler allows 0 randomness, making the distribution fixed We propose CoNN to predict functional tags in SRL. This implementation adopts the RNN as the encoder to encode the input sequence and a feedforward neural net as a predictor. Furthermore, a scheduler is designed and trained with customized reinforcement learning techniques to efficiently generate input sequences. The evaluation demonstrates better performance of CoNN than state-of-art methods that focus on all SRL tags, confirming our argument that functional tags need to be modeled separately for better overall accuracy.

In one embodiment, a method for predicting functional tags of Semantic Role Labeling (SRL) in a sentence may include receiving training data, wherein each training datum includes a dependency tree having zero or more sub-trees labeled with ground-truth functional tags, training a model that includes a Scheduler, an Encoder, and a Predictor, wherein (i) the Scheduler is any function that maps a feature vector to an action ranking vector (including but not limited to logistic regression, SVM, fully-connected neural network, etc.), determines tokens to pass to the Encoder, and decides when to invoke the Predictor, (ii) the Encoder is any function that maps a sequence of input data to a feature vector (including but not limited to Recurrent Neural Network, Hidden Markov model, Long-short Term Memory, etc.), (iii) the Predictor is any function that maps a feature vector to a vector of functional tags (including but not limited to logistic regression, SVM, fully-connected neural network, etc.), and (iv) wherein during the training, the error of prediction is used to adjust the parameters of the Predictor, the Encoder, and the Scheduler, and applying the trained model to predict functional tags in the sentence.

Additionally, the training strategy may include a cold-start strategy used by the Scheduler, by adopting a uniform distribution of actions to generate the action ranking vector, a warm-up strategy used by the Scheduler, by adopting an epsilon-greedy method to modify the action ranking vector, i.e., partially based on the estimated probability of action and partially based on a uniform distribution, and a heat-converge strategy used by the Scheduler, by adopting maximum-likelihood action to modify the action ranking vector.

Figure 8:
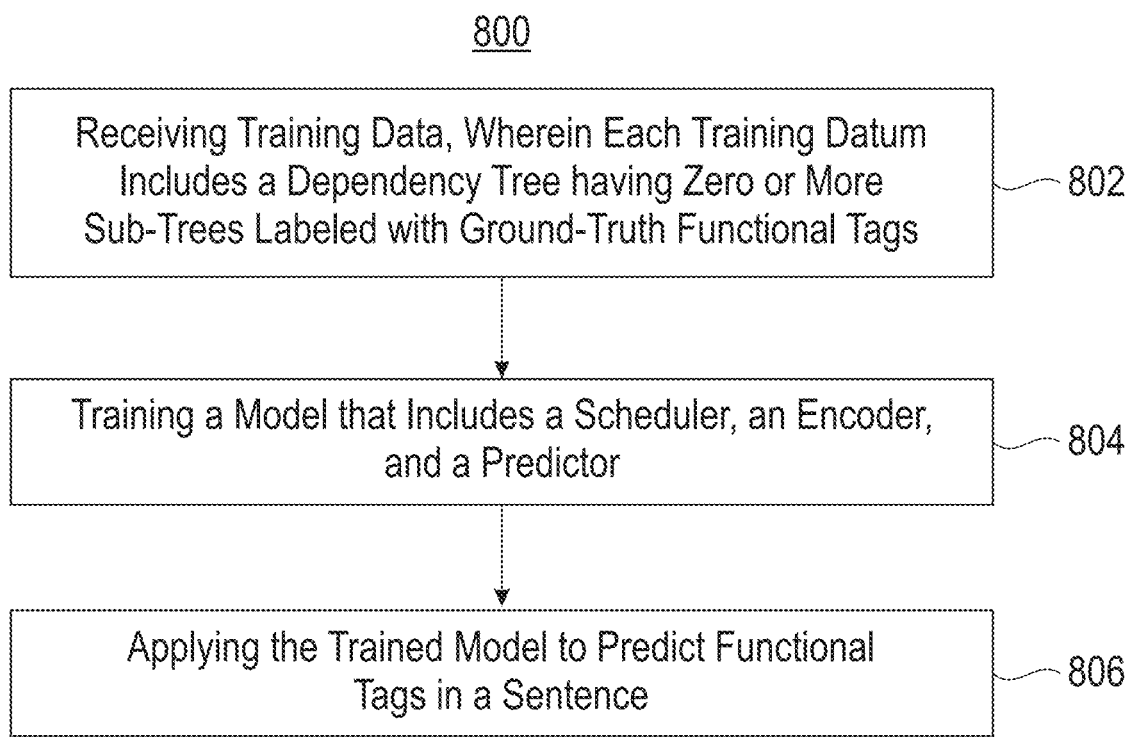
FIG. 8 illustrates a method for predicting functional tags of Semantic Role Labeling (SRL) in a sentence, in accordance with one embodiment of the present invention.

Now referring to FIG. 8, a flowchart of a method 800 for predicting functional tags of Semantic Role Labeling (SRL) in a sentence is shown according to one embodiment. The method 800 may be performed in accordance with the present invention in any of the environments depicted in FIGS. 1, 2, 5, 6, and 7, among others, in various embodiments. Of course, greater or fewer operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where training data is received, wherein each training datum includes a dependency tree having zero or more sub-trees labeled with ground-truth functional tags. Additionally, method 800 may proceed with operation 804, where a model is trained, where the model includes a Scheduler, an Encoder, and a Predictor.

Additionally, in one embodiment, the Scheduler may include any function that maps a feature vector to an action ranking vector (including but not limited to logistic regression, SVM, a fully-connected neural network, etc.), determines tokens to pass to the Encoder, and decides when to invoke the Predictor.

In another embodiment, the Encoder may include any function that maps a sequence of input data to a feature vector (including but not limited to a Recurrent Neural Network, a Hidden Markov model, Long-short Term Memory, etc.). In yet another embodiment, the Predictor may include any function that maps a feature vector to a vector of functional tags (including but not limited to logistic regression, SVM, a fully-connected neural network, etc.).

In still another embodiment, during the training, the error of prediction is used to adjust the parameters of the Predictor, the Encoder, and the Scheduler. Further, method 800 may proceed with operation 806, where the trained model is applied to predict functional tags in a sentence.

Further still, in one embodiment, the training strategy may include one or more of a cold-start strategy used by the Scheduler, by adopting uniform distribution of actions to generate the action ranking vector; a warm-up strategy used by the Scheduler, by adopting an epsilon-greedy method to modify the action ranking vector (i.e., partially based on the estimated probability of action and partially uniform); and a heat-converge strategy used by the Scheduler, by adopting maximum-likelihood action to modify the action ranking vector.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, a training data instance and a target instance; and
   training a model that includes a scheduler, an encoder, and a predictor,
   wherein the scheduler is a function that maps a feature vector to an action ranking vector, determines tokens to pass to the encoder, and decides when to invoke the predictor;
   wherein the encoder is a function that maps an input sequence to a feature vector;
   wherein the predictor is a function that maps the feature vector to a vector of functional tags; and
   wherein during the training, an error of prediction is used to adjust parameters of the predictor and the scheduler,
   wherein the training includes three phases, the three phases including:
   (a) a cold-start strategy used by the scheduler, by adopting a uniform distribution of actions to generate an action ranking vector,
   (b) a warm-up strategy used by the scheduler, by adopting an epsilon-greedy method to modify the action ranking vector, and
   (c) a heat-converge strategy used by the scheduler, by adopting maximum-likelihood action to modify the action ranking vector.

2. The computer-implemented method of claim 1, wherein:
   the training data instance includes a sentence represented as a dependency tree,
   the target instance includes a portion of the dependency tree,
   the input sequence is generated from the training data instance and the target instance;
   the input sequence includes a restructured training data instance and target instance that are understandable by the encoder, and
   the feature vector includes one or more features of the target instance within the training data instance.

3. The computer-implemented method of claim 1, wherein the training data instance includes a sentence represented as a dependency tree.

4. The computer-implemented method of claim 1, wherein the training data instance includes a plurality of identified and labeled dependencies.

5. The computer-implemented method of claim 1, wherein the target instance includes a portion of a dependency tree.

6. The computer-implemented method of claim 1, wherein the target instance includes a subtree within a dependency tree.

7. The computer-implemented method of claim 1, wherein the feature vector includes one or more features of the target instance within the training data instance.

8. The computer-implemented method of claim 1, wherein the scheduler is selected from a group consisting of a logistic regression module, a support vector machine (SVM), and a fully connected neural network.

9. The computer-implemented method of claim 1, wherein the encoder is selected from a group consisting of a recurrent neural network (RNN), a hidden Markov model, and long-short term memory.

10. The computer-implemented method of claim 1, wherein the predictor is selected from a group consisting of a logistic regression module, a support vector machine (SVM), and a fully connected neural network.

11. The computer-implemented method of claim 1, wherein the feature vector is sent to the predictor in response to the scheduler determining that the feature vector is sufficient to invoke the predictor, wherein the feature vector is not sent to the predictor in response to the scheduler determining that the feature vector is not sufficient to invoke the predictor.

12. The computer-implemented method of claim 1, wherein an input sequence is generated from the training data instance and the target instance based on a predetermined strategy, wherein the predetermined strategy includes the cold-start strategy where the scheduler adopts a uniform distribution to generate the input sequence.

13. The computer-implemented method of claim 1, wherein an input sequence is generated based on a predetermined strategy, wherein the predetermined strategy includes a warmup strategy, where the scheduler adopts the epsilon-greedy method to generate the input sequence.

14. The computer-implemented method of claim 1, wherein an input sequence is generated based on a predetermined strategy, wherein the predetermined strategy includes the heat-converge strategy where the scheduler adopts the maximum-likelihood action to generate the input sequence.

15. A computer program product for predicting functional tags of semantic role labeling, the computer program product comprising a computer readable storage medium having program instructions embodied therewith, the program instructions executable by a processor to cause the processor to:
   receive, at a scheduler utilizing the processor, a textual training data instance and a target instance, wherein the training data instance includes a plurality of identified and labeled dependencies;
   generate, by the scheduler utilizing the processor, an input sequence from the training data instance and the target instance by parsing the input sequence and the target instance;
   send the input sequence from the scheduler to an encoder, utilizing the processor;
   map, by the encoder utilizing the processor, the input sequence to a feature vector;
   send the feature vector from the encoder to the scheduler, utilizing the processor;
   invoke a predictor by sending the feature vector from the scheduler to the predictor, utilizing the processor;

map, by the predictor utilizing the processor, the feature vector to a class vector to create a label for the target instance; and train a model that includes the scheduler, the encoder, and the predictor, wherein the training includes three phases, the three phases including:
(a) a cold-start strategy used by the scheduler, by adopting a uniform distribution of actions to generate an action ranking vector, wherein the scheduler is a function that maps a feature vector to an action ranking vector, determines tokens to pass to the encoder, and decides when to invoke the predictor,
(b) a warm-up strategy used by the scheduler, by adopting an epsilon-greedy method to modify the action ranking vector, and
(c) a heat-converge strategy used by the scheduler, by adopting maximum-likelihood action to modify the action ranking vector.

16. The computer program product of claim 15, wherein the training data instance includes a sentence represented as a dependency tree.

17. The computer program product of claim 15, wherein the scheduler is selected from a group consisting of a logistic regression module, a support vector machine (SVM), and a fully connected neural network; and further comprising:
comparing the label to a predetermined training label to determine a difference between the label and the predetermined training label; and
adjusting the predictor and the scheduler, based on the difference.

18. A system, comprising:
a processor; and
logic integrated with the processor, executable by the processor, or integrated with and executable by the processor, the logic being configured to train a model that includes a scheduler, an encoder, and a predictor, the logic being configured to:
receive, at the scheduler, a textual training data instance and a target instance;
generate, by the scheduler, an input sequence from the training data instance and the target instance by parsing the input sequence and the target instance;
send the input sequence from the scheduler to an encoder;
map, by the encoder, the input sequence to a feature vector;
send the feature vector from the encoder to the scheduler;
send the feature vector from the scheduler to a predictor, wherein the feature vector is conditionally sent from the scheduler to the predictor based on one or more criteria; and
map, by the predictor, the feature vector to a class vector to create a label for the target instance, the label including a predicted nonfunctional label that predicts whether the target instance is a functional tag, the functional tag including a portion of a sentence that includes details about an action being performed within the sentence;
compare the label to a predetermined training label to determine a difference between the label and the predetermined training label;
adjust the predictor and the scheduler, based on the difference,
wherein the training includes three phases, the three phases including:
(a) a cold-start strategy used by the Scheduler, by adopting a uniform distribution of actions to generate an action ranking vector,
(b) a warm-up strategy used by the Scheduler, by adopting an epsilon-greedy method to modify the action ranking vector, and
(c) a heat-converge strategy used by the Scheduler, by adopting maximum-likelihood action to modify the action ranking vector.

19. The system of claim 18, wherein the feature vector is sent by the scheduler to the predictor in response to the scheduler determining that the feature vector is sufficient to invoke the predictor, wherein the feature vector is not sent to the predictor in response to the scheduler determining that the feature vector is not sufficient to invoke the predictor.

20. A computer-implemented method, comprising:
receiving training data, wherein each training datum includes a dependency tree having one or more sub-trees labeled with ground-truth functional tags;
training a model that includes a Scheduler, an Encoder, and a Predictor, wherein:
(i) the Scheduler is a function that maps a feature vector to an action ranking vector, determines tokens to pass to the Encoder, and decides when to invoke the Predictor;
(ii) the Encoder is a function that maps a sequence of input data to a feature vector;
(iii) the Predictor is a function that maps the feature vector to a vector of functional tags;
(iv) wherein during the training, an error of prediction is used to adjust parameters of the Predictor, the Encoder, and the Scheduler; and
(v) wherein the training includes three phases, the three phases including:
(a) a cold-start strategy used by the Scheduler, by adopting a uniform distribution of actions to generate an action ranking vector,
(b) a warm-up strategy used by the Scheduler, by adopting an epsilon-greedy method to modify the action ranking vector, and
(c) a heat-converge strategy used by the Scheduler, by adopting maximum-likelihood action to modify the action ranking vector; and
applying the trained model to predict functional tags in a sentence.

* * * * *